Sept. 6, 1966  S. BÄTZ ETAL  3,270,384
MOLDING FASTENER WITH PENETRATING PRONGS
Filed Jan. 20, 1964
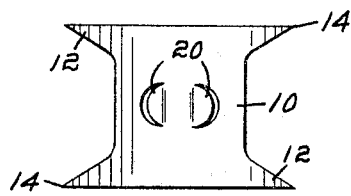
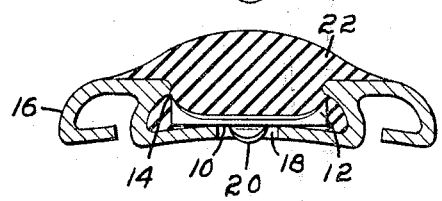
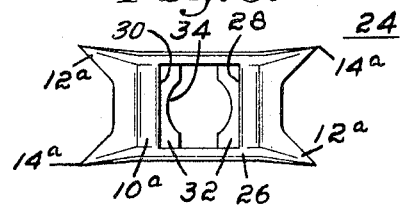
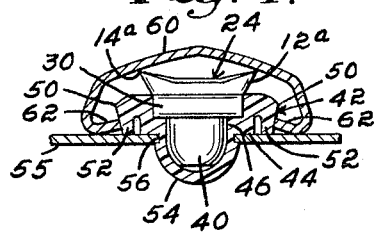
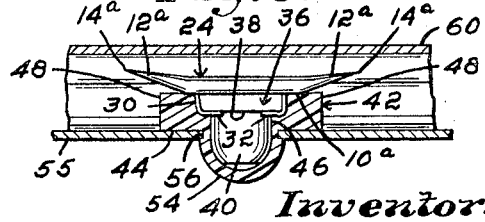
Inventors:
Stefan Bätz,
Karl Stark,
Heinrich Overhoff,
by Gordon Hechman
Att'y.

United States Patent Office 3,270,384
Patented Sept. 6, 1966

3,270,384
MOLDING FASTENER WITH PENETRATING PRONGS
Stefan Bätz, Sindelfingen, Wurttemberg, Heinrich Overhoff, Lorrach, Baden, and Karl Stark, Sindelfingen, Wurttemburg, Germany, assignors to A. Raymond, Baden, Germany, a firm
Filed Jan. 20, 1964, Ser. No. 339,020
3 Claims. (Cl. 24—73)

This invention relates generally to fastening devices and more specifically to fastening devices utilized with automobiles, moldings and the like.

An object of the present invention is to provide a molding fastener having means for preventing displacement of the molding on a plane parallel to the surface of the support.

Another object of the present invention is to provide a molding fastener having at least three points of contact with the molding.

A still further object of the present invention is to provide a stud and sockett engagement between the fastener and an element of the assembly attached to the support.

Other objects of the invention will, in part, be obvious, and will, in part, appear hereinafter.

In the drawings:

FIG. 1 is a top plan view of a fastener embodying some aspects of the invention;

FIG. 2 is a cross-section of the support and the molding engaged with the fastener shown in side elevation;

FIG. 3 is a top plan view of the shell element of a variation of the fastener shown in FIG. 1;

FIG. 4 is a section of the molding support and socket element of the fastener showing the shell element and stud element of the fastener in end elevation, all assembled; and FIG. 5 is a section of the molding support and socket element of the fastener showing the shell element and stud element of the fastener in side elevation, all assembled.

Referring to FIGS. 1 and 2 of the drawing there is shown a molding fastener comprising a base portion 10, formed of a hardened metal, in the general form of a rectangle. A claw or prong 12 extends from each corner of the base portion 10 having an actute apex angle providing a sharp tip 14. One side of each of the prongs 12 is a continuation of a side of the base portion 10 as best shown in FIG. 1. The base portion 10 may also be arced thereby displacing the tip 14 from planes drawn through the base portion 10 at right angles to the horizontal axis of the fastener. The prongs 12 therefore obtain the ability to be anchored in the material to which it is to be secured preventing displacement or sliding. The fastener shown in FIG. 1 is formed to be inserted in a groove in a support 16. An aperture 18 is formed in the groove as shown in FIG. 2. The fastener includes at least two arced spring uprights 20 formed from the material of the base portion 10 and extending from the base portion 10 in generally opposite directions from that of the prongs 12. The spring uprights 20 are jammed into the aperture 18 and the ends of the spring uprights 20 are placed under tension against the wall of the aperture 18. A tool (not shown) may be utilized to force the uprights 20 toward each other to assist in engagement. The terminal ends of the uprights 20 may be bent upwardly either prior to or during engagement. A plastic or rubber molding 22 can then be engaged with the support 16 and the fastener which engagement will drive the prongs 12 into the material of the molding 22 as shown in FIG. 2. During this engagement the arc of the base portion 10 is flattened slightly, thereby increasing the holding power of the prongs 12.

A variation of the fastener is illustrated in FIGS. 3–5. The variant comprises a shell element 24 including a base portion 10a having a generally rectangular configuration and having its two longer sides bent upward to provide sides 26.

A rectangular recess 28 is formed in the base portion 10a and the two short sides of the base portion 10a are arced from the edges of the rectangular recess to the edge of the short sides. Four prongs 12a are formed at the corners of the base portion 10a and form continuations of the arc of the base portion 10a, as do the prongs 12 in the first form of the fastener.

The prongs 12a have tips 14a similar to the tips 14.

A pair of arms 30 extend from the base portion 10a. Each of the arms 30 comprises a free terminal end 32 having an arcuate slot 34 formed therein. The arms 30 each extend from a side of the rectangular recess 28, and the free ends 32 are bent in a manner which places them over the area defined by the recess 28. The arms 30 are also in spaced opposed relationship, as shown in FIG. 3.

The base portion 10A may be slotted from the rectangular recess 28 to provide greater flexibility of the arms 30.

A plug element 36 comprises a rectangular foundation 38 and a cylindrical barrel 40 extending from the median area of the foundation 38.

The plug element 36 is engaged with shell element 24 by passing the barrel 40 through the rectangular recess 28 until the foundation 38 rests on the shoulders formed by the bent terminal ends 32 of the shell element 24. At the same time the barrel 40 will also pass between the arcuate slots 34 which are separated a distance less than the diameter of the barrel 40. The barrel 40 being formed of a plastic material and the arms 30 being formed of spring steel, as is the whole shell element 24, the edges of the arcuate slots 34 will dig into the barrel 40, securing the plug element 36 to the shell element 24.

A socket element 42 comprises a rectangular support portion 44 having an engagement aperture 46 formed therethrough. The support portion 44 has two solid rectangular bar portions 48 extending along opposed edges in spaced parallel relation to each other. A pair of engagement portions 50 extend from the support portion 44 connecting the two bar portions 48. The engagement portions 50 lie along the two remaining sides of the support portion 44 and each one includes a leg portion 52 which extends from and lies in parallel spaced relation to the remaining part of the engagement portions 50. A closed end tubular socket portion 54 extends from the support portion 44, having its wall a continuation of the wall of the engagement aperture 46 and having its axis concentric with the axis of the engagement aperture 46. The socket element 42 is formed of a plastic material.

The socket element 42 is engaged to a metal support 55, such as an automobile body or the like, through a support aperture 56 formed in the support 55. The diameter of the support aperture 56 is slightly less than the outside diameter of the socket portion 54.

The wall of the support aperture 56 will dig into the socket portion 54, as shown in FIGS. 4 and 5, and there will be a slight inward collapsing of the wall of the socket portion 54 which will return after its engagement until fixed in place.

The assembly of the shell element 24 and the plug element 36 can now be engaged to the socket element 42 by pressing the barrel 40 into the socket portion 54; at the same time the rectangular configuration defined by the extension arms 30 will, because this latter configuration has a width slightly greater than the width of the opening defined by the bar portions 48 and the engagement portions 50, flex the bar portions 48 and the engagement portions 50 slightly away from the axis of the fastener, completing the engagement.

The molding 60 is formed of metal and in cross-section defines a channel having its terminal ends bent toward each other.

The terminal ends of the molding 60 provide a pair of engagement wings 62.

The engagement of the molding 60 with the fastener assembly and the support can be easily accomplished due to three factors:

(1) The distance between the engagement wings 62 is slightly less than the distance between the relaxed outside surfaces of the engagement portions 50.

(2) The distance between the pairs of opposed tips 14a and the prongs 12a is greater than the distance between the engagement wings 62 of the molding 60.

(3) The distance between the upper surface of the support 55 and the tips 14a of the prongs 12a is slightly greater than the height of the undersurface of the molding 60, which is thereby engaged by the tips 14a.

While there have been illustrated and described preferred embodiments of the invention, reference is made to the following claims for the best description of the invention.

We claim:

1. A fastening device comprising a shell element and a plug element, said shell element being formed of a hardened metal and including an arced base portion having at least two prongs extending from said base portion and defining continuations of the arc provided by said base portion, each of said prongs terminating in a sharp tip and said base portion having two arms spaced from each other, each of said arms having a free terminal end bent toward the other, defining an aperture, and said plug element, formed of a plastic material, comprising a foundation portion and a barrel portion, said foundation portion being in superposed relation with said free terminal ends and said barrel portion extending through said aperture and engaged by said free terminal ends.

2. A fastening device comprising a stud assembly and a socket element, said stud assembly comprising a shell element and a plug element, said shell element being formed of a hard, resilient material and including an arced substantially rectangular base having at least one prong extending from each corner of said base, said prongs defining continuations of the arc of said base, each of said prongs terminating in a sharp tip, said plug element being formed of a plastic material comprising a foundation portion and an integral barrel portion extending from said foundation portion, said base having a pair of arms extending in directions generally opposed to said prongs and having means of engaging said barrel, said means having an aperture formed therethrough, said socket element comprising a support portion having an engagement aperture formed therethrough and a socket portion in the form of a closed end tube extending from said support portion and having its axis coincident with that of said engagement aperture and having a pair of bar portions extending from said support portion in spaced substantially parallel relationship and a pair of engagement portions connecting said bar portions to provide a rectangular area, said engagement portions having a pair of leg portions extending therefrom, said socket element being adapted to be attached to a support, with said socket portion having a part thereof engaged within an aperture formed through said support and said support portion lying on the surface of said support surrounding said aperture, and said leg portions being adapted to be engaged by the inturned wings of a molding.

3. The combination of a fastening device, molding, and a support, said fastening device comprising a stud assembly and a socket element, said stud assembly comprising a shell element and a plug element, said shell element being formed of a hardened, resilient metal and including an arced substantially rectangular base having at least one prong extending from each corner of said base, said prongs defining continuations of the arc provided by said base, each of said prongs terminating in a sharp tip, said plug element being formed of a plastic material and comprising a foundation portion and an integral barrel portion extending from said foundation portion, said base of said shell element having a pair of arms extending therefrom in directions generally opposed to said prongs, and having means of engaging said barrel portion, said means having an aperture formed therethrough, said socket element comprising a support portion having an engagement aperture formed therein and a socket portion in the form of a closed end tube extending from said support portion and having its axis coincident with that of said engagement aperture, and having a pair of bar portions extending from said support portion in spaced substantially parallel relationship and a pair of engagement portions connecting said bar portions to provide a rectangular area, said engagement portions having a pair of leg portions extending therefrom, and said support having a support aperture formed therethrough, said socket portion having a part thereof engaged within said support aperture, said engagement aperture formed in said support portion having a diameter which, when said barrel portion is not inserted in said engagement aperture, is slightly less than the diameter of said barrel portion, an edge of each of said engagement portions engaging a part of said barrel portion, said foundation portion being in abutting relationship with said support adjacent said support aperture, and said molding being in the form of a channel providing a pair of wings in spaced opposed relationship, each of said wings engaging a leg portion extending from said foundation portion.

References Cited by the Examiner

UNITED STATES PATENTS

| | | | |
|---|---|---|---|
| 2,010,519 | 8/1935 | Jones | 85—36 |
| 2,379,349 | 6/1945 | Grinde et al. | 85—26 X |
| 2,382,936 | 8/1945 | Bedford | 85—36 |
| 2,596,780 | 5/1952 | Meyers et al. | 85—5 X |
| 2,817,131 | 12/1957 | Seegers | 24—73 |
| 2,859,469 | 11/1958 | Stockdale | 16—42 |

WILLIAM FELDMAN, *Primary Examiner.*

DONLEY J. STOCKING, *Examiner.*

E. SIMONSEN, *Assistant Examiner.*